No. 853,103. PATENTED MAY 7, 1907.
A. G. MAY.
FEED BAG.
APPLICATION FILED FEB. 2, 1907.

2 SHEETS—SHEET 1.

Inventor
Augustus G. May

Witnesses
Frank B. Hoffman
D. W. Gould.

By Victor J. Evans
Attorney

No. 853,103.
PATENTED MAY 7, 1907.
A. G. MAY.
FEED BAG.
APPLICATION FILED FEB. 2, 1907.
2 SHEETS—SHEET 2.
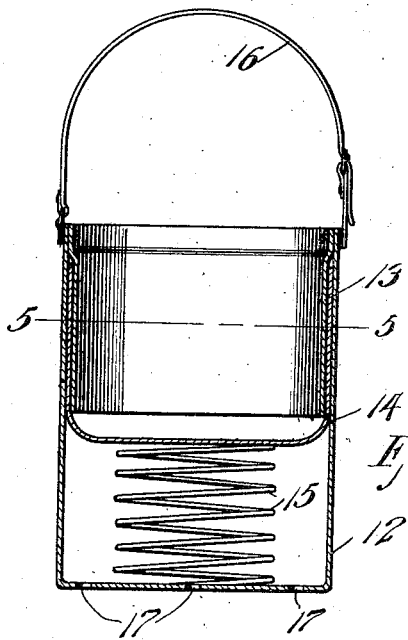
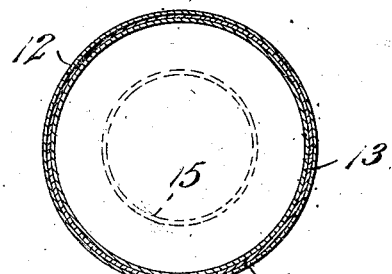
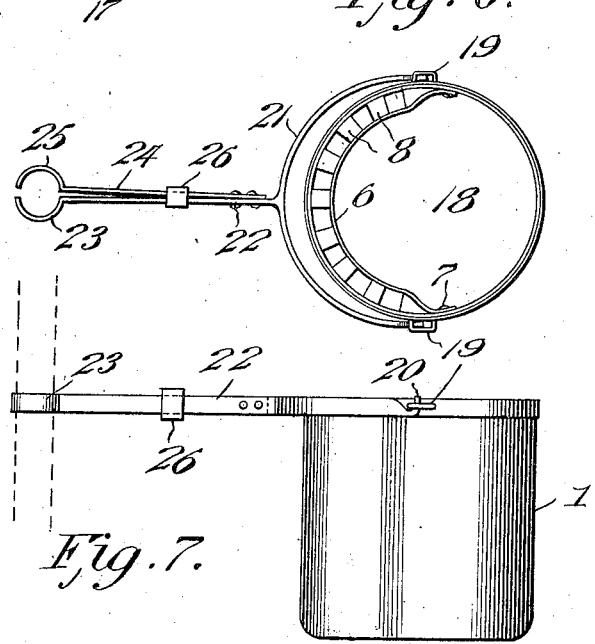
Witnesses
Frank B. Hoffman
Frank Haugh
Inventor
Augustus G. May,
By Victor J. Evans
Attorney

UNITED STATES PATENT OFFICE.

AUGUSTUS G. MAY, OF DENVER, COLORADO.

FEED-BAG.

No. 853,103.  Specification of Letters Patent.  Patented May 7, 1907.

Application filed February 2, 1907. Serial No. 355,492.

*To all whom it may concern:*

Be it known that I, AUGUSTUS G. MAY, a citizen of the United States, residing at Denver, in the county of Denver and State of Colorado, have invented new and useful Improvements in Feed-Bags, of which the following is a specification.

The invention relates to an improvement in feed bags for animals constructed and arranged to automatically and properly present the food to the mouth of the animal when the bag is in position.

The main object of the present invention resides in the production of a simple feed bag by which the food is automatically maintained at all times in proper relation to the mouth of the animal, the construction including a ventilating means by which fresh air is admitted to the bag while the same is in use.

The invention will be described in the following specification, reference being had to the accompanying drawings, in which:—

Figure 1:
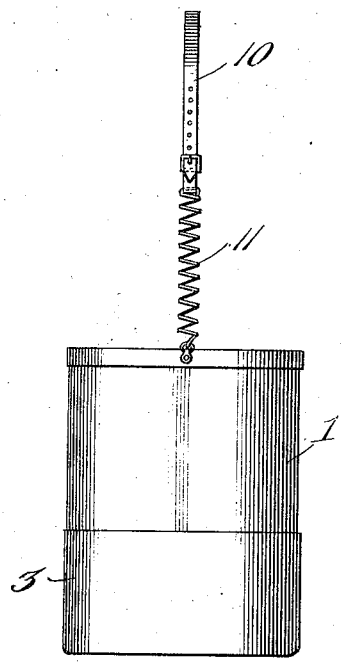
Figure 2:
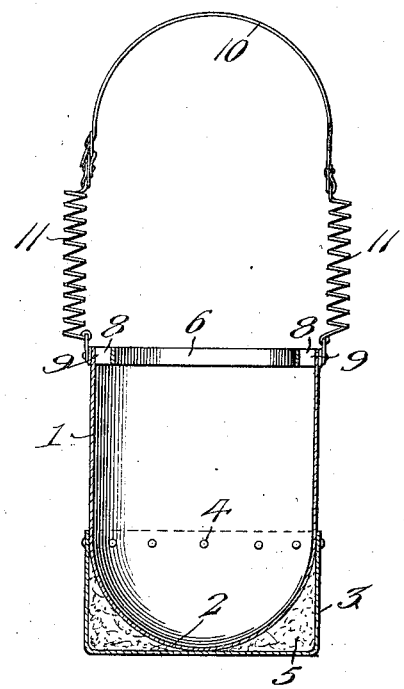
Figure 3:
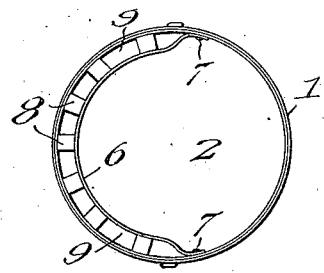

Figure 1 is a side elevation of a bag constructed in accordance with my invention, Fig. 2 is a vertical central section of the same, Fig. 3 a top plan with the suspending means omitted. Fig. 4 is a vertical sectional view of a feed bag constructed in acordance with my invention, a slightly modified arrangement being illustrated, Fig. 5 is a section on line 5—5 of Fig. 4, Fig. 6 is a plan of my improved feed bag showing an attaching means therefor, Fig. 7 is a side elevation of the same.

Referring particularly to Figs. 1, 2, and 3 of the drawings my improved feed bag comprises a receptacle 1 of flexible material, as leather or the like, open at the upper end and rounded or of semispherical shape at the bottom, as at 2. The rounded shape of the bottom of the receptacle is desirable as it tends to direct all food in the receptacle toward the lowest point or center of the bottom, thereby enabling the same to be conveniently grasped by the lips of the animal.

Under constant use it is obvious that the rounded bottom 2, if unprotected would be distorted with obvious disadvantage in use, and to avoid such distortion I reinforce the rounded bottom 2 of the receptacle with a casing 3, preferably circular in plan and of hollow construction to receive the rounded bottom, the upper edge of the side wall of the casing being secured to the side wall of the receptacle by rivets 4, or other suitable fastenings. As the casing 3 is circular in plan with a flat bottom, it is obvious that with the receptacle 1 secured therein a space will be provided between the semi-spherical bottom of the receptacle, and the bottom side wall of the casing. This space is filled with a suitable packing, as 5, so shaped as to brace and reinforce the bottom 2 of the receptacle 1, thus maintaining the semi-spherical form of the latter notwithstanding continued use.

To secure a proper ventilation of the feed bag in use I provide a strap 6 of substantial width and of a length somewhat in excess of half the circumference of the upper portion of the mouth of the bag. The strap is terminally secured at 7 to opposing points of the bag so that the upper edge of the strap is in alinement with the upper edge of the bag. Intermediate the points of attachment the strap is spaced from the bag by a series of blocks 8, preferably of leather or the like, which are disposed between the proximate surfaces of the bag and strap and maintained in relatively spaced relation. By this construction a series of air inlets 9 are provided which cannot be closed by the head of the animal in using the bag.

The bag is supported by a head strap 10 terminally connected to diametrically opposed points of the bag through the medium of coil springs 11. The springs are so tensioned that under normal conditions the bottom of the bag is spaced from the highest point of the head strap such a distance as to be within convenient reach of the lips of the animal when the bag is applied. Therefore, under the weight of the contained food the springs 11 will be distended. As the weight of food is reduced by the animal the bag will gradually rise under the influence of the springs 11, thereby automatically presenting the food within convenient reach of the animal's lips at all times.

Referring particularly to Figs. 4 and 5, wherein is illustrated a slightly modified form of feed bag, the receptacle 12 is provided on its inner surface with a sealing member 13, preferably in the form of a sleeve and connected at its upper end to the upper end of the receptacle. Below the point of connection the sleeve is spaced from the wall of the receptacle to provide for the reception within said space of the feed carrier 14. The carrier is in the form of a feed bag, and is freely movable vertically within the receptacle 12, it being understood that the parts are so arranged that the relatively upper end of the carrier 14 is at all times disposed between the sealing member 13 and the wall of the receptacle. Between the bottom of the carrier and the bottom of the receptacle is arranged a coil spring 15, so tensioned as to overbalance the weight of the carrier and normally maintain the same at its upward limit of movement. In the use of this form of feed bag it is obvious that the weight of the feed within the carrier will depress the same against the tension of the coil spring, and as the food is consumed the spring will tend to move the bottom of the carrier upward, thereby maintaining at all times a supply of food within convenient reach of the mouth of the animal. The feed bag is provided with the form of ventilating means illustrated in Figs. 1 to 3, and is supported through the medium of the usual or any preferred form of head strap 16. The bottom of the receptacle 12 is formed with a series of openings 17 whereby to permit the escape of any of the feed finding its way past the carrier.

In Figs. 6 and 7 is illustrated a form of attachment for the feed bag primarily adapted for co-operation with a post, tree, tent pole, or the like, wherein the feed bag 18, of either the preferred or modified construction, is formed at diametrically opposed points with eyes 19, designed to receive pin terminals 20 of a supporting rod, which comprises a semi-cylindrical section 21 to surround the outer portion of the bag from one eye to the other, and a supporting bar 22 secured to or formed integral with the section 21 and terminally provided with a semi-cylindrical clamping ring 23. A spring bar 24 is secured to the bar 22 adjacent its juncture with the section 21, said bar being also formed with a semi-cylindrical clamping ring 25 arranged to co-operate with the ring 23. A clip 26 slidably engages the bars 22 and 24, being so arranged that in the movement of the ring toward the free end of said bars, the clamping members 23 and 25 will be forced into proximate clamping position, the movement of said clip in the opposite direction permitting such free movement of the clamping members as will permit their disengagement from the support.

By the use of this device it is obvious that the feed bag may be conveniently supported upon any fixture in which the clamping members may co-operate, the arrangement of parts providing for the convenient engagement or disengagement of said members.

The material of the bag is not important for the purposes of the present invention, though leather or similar fabric is preferred.

As described the construction of the bag provides a simple device which will automatically present the food convenient to the lips of the animal, insure a free admission of air to the bag while the same is in use, and maintain a rounded condition of the bottom thereof to insure the gravitation of the food toward the central point.

Having thus described the invention what is claimed as new, is:—

1. A feed bag comprising a receptacle, a strap secured to the wall of the receptacle adjacent the upper end, and a series of blocks secured between the receptacle wall and the strap, said blocks being respectively spaced to provide air inlets.

2. A feed bag comprising a receptacle, a strap secured to the wall of the receptacle adjacent the upper end, a series of blocks secured between the receptacle wall and the strap, said blocks being respectively spaced to provide air inlets, and spring means for counterbalancing the weight of the feed carrier.

3. A feed bag comprising a receptacle, a strap secured to the wall of the receptacle adjacent the upper end, a series of blocks secured between the receptacle wall and the strap, said blocks being respectively spaced to provide air inlets, and an adjustable clamping support removably engaging the bag.

In testimony whereof, I affix my signature in presence of two witnesses.

AUGUSTUS G. MAY.

Witnesses:
O. R. BOWERSOX,
ARCHER H. BROWNE.